(12) United States Patent
Kim

(10) Patent No.: US 11,228,135 B2
(45) Date of Patent: Jan. 18, 2022

(54) CONNECTOR FOR DISPLAYED MOBILE DEVICE

(71) Applicant: Kum Oh Electronics CO., LTD., Bucheon-si (KR)

(72) Inventor: Ki Sang Kim, Bucheon-si (KR)

(73) Assignee: KUM OH ELECTRONICS CO., LTD., Bucheon-si (KR)

( * ) Notice: Subject to any disclaimer, the term of this patent is extended or adjusted under 35 U.S.C. 154(b) by 0 days.

(21) Appl. No.: 17/077,394

(22) Filed: Oct. 22, 2020

(65) Prior Publication Data

US 2021/0135394 A1  May 6, 2021

(30) Foreign Application Priority Data

Nov. 1, 2019  (KR) .......... 10-2019-0138803

(51) Int. Cl.
*H01R 13/50* (2006.01)
*H01R 13/516* (2006.01)

(52) U.S. Cl.
CPC .......... *H01R 13/516* (2013.01); *H01R 13/50* (2013.01)

(58) Field of Classification Search
CPC .......... H01R 13/5202; H01R 13/5213; H01R 13/72; H01R 13/6397; H01R 2201/26; H01R 12/775; H01R 13/639; H01R 13/665; H01R 24/60; H01R 31/065; H01R 13/10; H01R 13/20; H01R 13/5205; H01R 13/629; H01R 13/713; H01R 13/717; H01R 24/38; H01R 24/68; H01R 43/042; H01R 43/0486

See application file for complete search history.

(56) References Cited

U.S. PATENT DOCUMENTS

| | | | | |
|---|---|---|---|---|
| 6,711,921 B1* | 3/2004 | Yang | .................. | E05B 73/0082 248/551 |
| 9,499,373 B1* | 11/2016 | Kim | .................. | B65H 75/4428 |
| 10,026,281 B2* | 7/2018 | Henson | .............. | G08B 13/1445 |
| 2008/0142651 A1* | 6/2008 | Tomasini | ................ | H04M 1/04 248/176.1 |
| 2013/0093386 A1* | 4/2013 | Tsai | ...................... | H02J 7/0044 320/108 |
| 2014/0092531 A1* | 4/2014 | Trinh | .................... | A47F 7/0246 361/679.01 |

(Continued)

FOREIGN PATENT DOCUMENTS

| | | |
|---|---|---|
| CN | 208141546 | 11/2018 |
| CN | 209401947 | 9/2019 |

(Continued)

*Primary Examiner* — Truc T Nguyen
(74) *Attorney, Agent, or Firm* — Cantor Colburn LLP

(57) ABSTRACT

A connector for a displayed mobile device that is connected to a mobile device displayed in a store to supply power to the mobile device is proposed. More particularly, the connector for a displayed mobile device is usable for various types of mobile device. The connector includes: a charging cable having an insertion block, a connection terminal, and a screw hole; and a holder casing having a body, a support plate, and a long hole; and a fixing bolt fixing the insertion block of the charging cable to the body of the holder casing by being tightened and coupled to the screw hole after passing through the long hole. Therefore, an interval between the connection terminal and the support plate is adjustable.

4 Claims, 3 Drawing Sheets

(56) References Cited

U.S. PATENT DOCUMENTS

| | | | |
|---|---|---|---|
| 2014/0106608 A1* | 4/2014 | Howarth | A47F 7/0246 439/531 |
| 2016/0190838 A1* | 6/2016 | Webb | A47C 21/00 320/115 |
| 2018/0197389 A1* | 7/2018 | Grant | E05B 73/0082 |

FOREIGN PATENT DOCUMENTS

| | | |
|---|---|---|
| EP | 3118825 | 1/2017 |
| KR | 2019990036216 | 9/1999 |
| KR | 20120081007 | 7/2012 |
| KR | 101303147 | 9/2013 |
| KR | 101506994 | 3/2015 |
| KR | 200477762 | 7/2015 |
| KR | 101585997 | 1/2016 |

* cited by examiner

CONNECTOR FOR DISPLAYED MOBILE DEVICE

BACKGROUND OF THE INVENTION

Field of the Invention

The present disclosure relates generally to a connector for a displayed mobile device, the connector being connected to a mobile device displayed in a mobile device store, to supply power. More particularly, the present disclosure relates to a connector for a displayed mobile device, wherein the connector is configured to be used for various types of mobile devices by arbitrarily adjusting an interval between a connection terminal connected to the mobile device and a support plate supporting a rear surface of the mobile device.

Description of the Related Art

Due to the development of IT technology, various mobile devices, such as a smart phone, a laptop computer, a navigator, a digital camera, etc., are on the market.

In stores dealing in mobile devices, the mobile devices are displayed so that customers can observe and use the mobile devices.

In order to prevent the situation where the displayed mobile devices are turned off and customers cannot use the displayed mobile devices, each of the displayed mobile devices is connected to a connector and is supplied with power.

Korean Patent No. 10-1585997 "Antitheft apparatus for mobile device" discloses an apparatus capable of supplying power to a mobile device and preventing theft of the mobile device.

The apparatus includes: a base attached to a rear surface of a mobile device; a connection terminal provided in rear of the base and connected to a connection port of the mobile device; a separation detecting sensor provided in front of the base and detecting separation of the mobile device from the base; and an interval adjustment unit adjusting an interval between the base and the connection terminal. Therefore, the apparatus may be used for various types of mobile devices.

However, in Korean Patent No. 10-1585997 "Antitheft apparatus for mobile device", the interval adjustment unit is composed of complex components, such as an elevation block, a screw pin, an operation pin, and an idle inducing means. Therefore, the apparatus suffers from high manufacturing cost and low productivity.

SUMMARY OF THE INVENTION

Accordingly, the present disclosure has been made keeping in mind the above problems occurring in the related art, and the present disclosure is intended to propose a connector for a displayed mobile device that is usable for various types of mobile devices. Wherein, the connector can be produced at low manufacturing cost and with high productivity due to its simple configuration, is easily operated for interval adjustment, and can be used for various types of mobile devices.

In order to achieve the above objective, according to one aspect of the present disclosure, there is provided a connector for a displayed mobile device.

The connector may include: a charging cable including an insertion block, a connection terminal provided by protruding from an upper surface of the insertion block and connected to a connection port of the mobile device, and a screw hole provided on a lower surface of the insertion block; and a holder casing including a body having a slide space into which the insertion block is inserted in a sliding manner from a rear thereof and having an opening through which the connection terminal is exposed and protrudes, a support plate formed by protruding from a rear of an upper surface of the body and supporting a rear surface of the mobile device, and a long hole formed on a bottom plate of the body; and a fixing bolt fixing the insertion block of the charging cable to the body of the holder casing by being tightened and coupled to the screw hole after passing through the long hole, wherein an interval between the connection terminal and the support plate may be adjustable.

A lower surface of the bottom plate of the holder casing may have a seating depression in which a head of the fixing bolt may be seated.

The support plate of the holder casing may have a through hole through which the connection terminal may pass, and an opening and closing plate may be detachably coupled to the through hole.

A placing groove may be formed around the through hole on a front surface of the support plate, and a stopper may be formed by protruding from an edge of a front surface of the opening and closing plate, the stopper being placed in the placing groove and having a lower end placed on the upper surface of the body.

As described above, the connector for the displayed mobile device according to the present disclosure is configured to be adjustable for the interval adjustment between the connection terminal and the support plate, so the connector can be used for various types of mobile devices. The connector for the displayed mobile device can be easily used for various types of mobile devices only by the simple operation in which the fixing bolt is released to adjust the position of the connection terminal and then is tightened again. Accordingly, the connector for the displayed mobile device provides a product produced at low manufacturing cost and with high productivity due to its simple configuration, and is very useful for industrial development.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
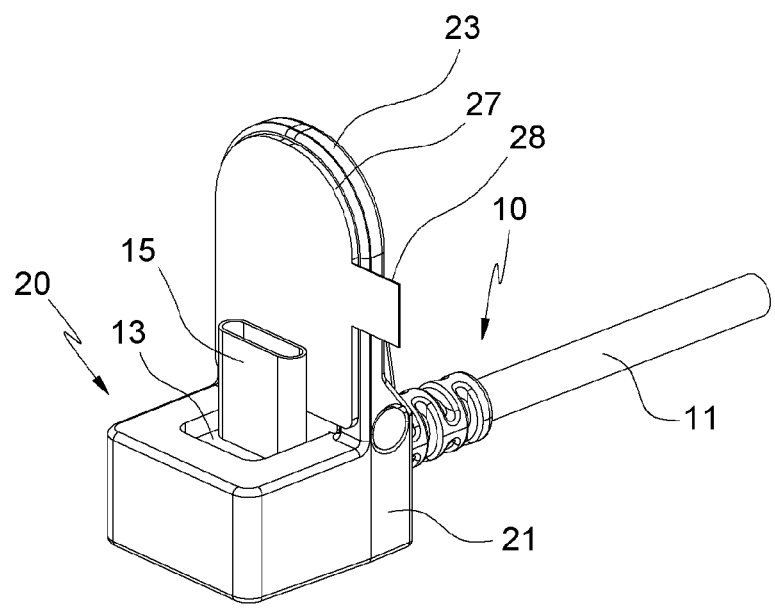
FIG. 1 is a perspective view showing a connector for a displayed mobile device according to the present disclosure.
Figure 1:
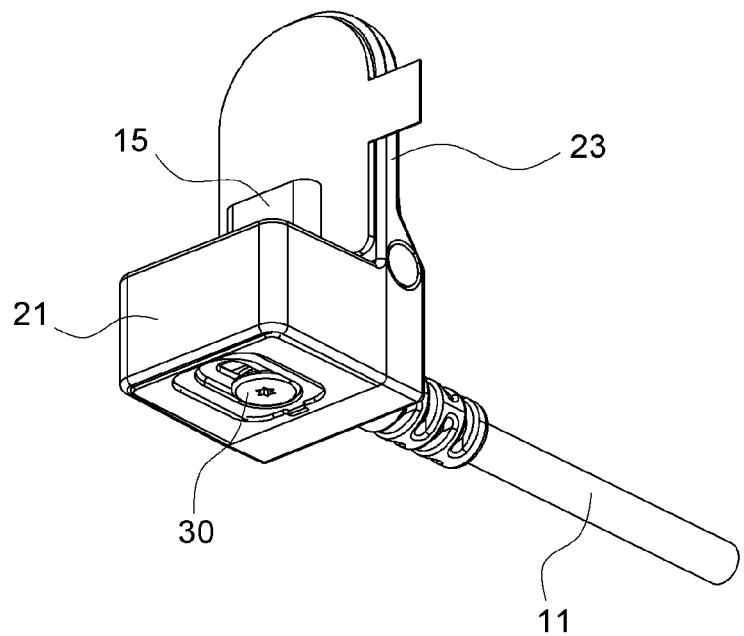
Figure 2:
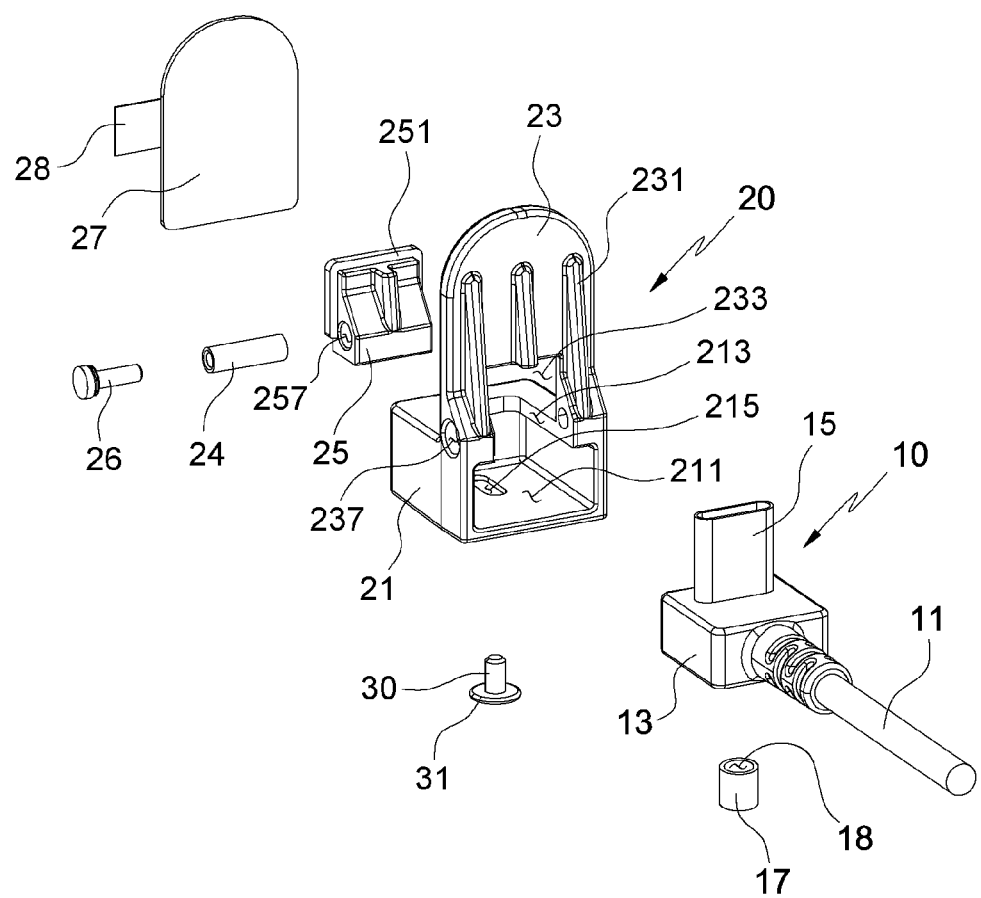
FIGS. 2 and 3 are exploded-perspective views of the connector of FIG. 1.
Figure 3:
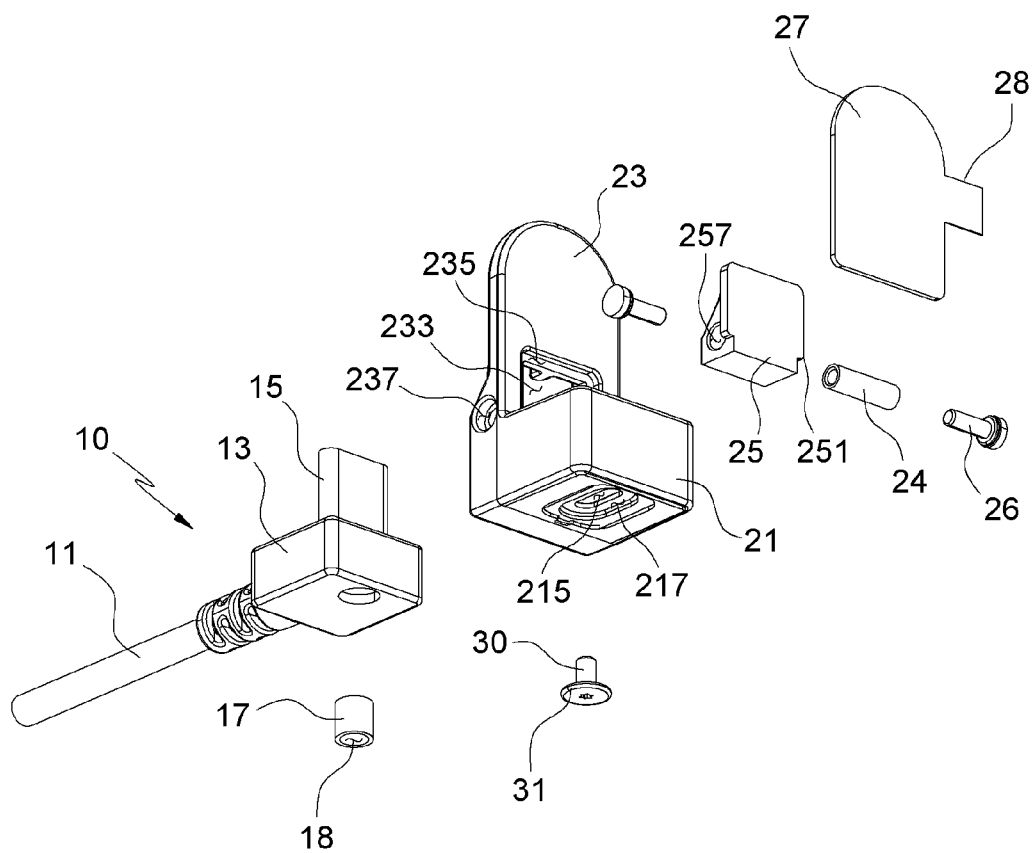

Hereinbelow, a connector for a displayed mobile device according to the present disclosure will be described in detail with reference to the drawings.

Prior to the detailed description of the connector for the displayed mobile device according to the present disclosure, the resent disclosure will now be described in detail on the basis of aspects (or embodiments). The present disclosure may, however, be embodied in many different forms and should not be construed as being limited to only the embodiments set forth herein, but should be construed as covering modifications, equivalents or alternatives falling within ideas and technical scopes of the present disclosure.

In the drawings, like reference numerals, particularly, reference numerals having the same last two digits or the same last two digits and letters, refer to like elements having like functions throughout, and unless the context clearly indicates otherwise, elements referred to by reference numerals of the drawings should be understood on the basis of this standard.

Also, for convenience of understanding of the elements, in the drawings, sizes or thicknesses may be exaggerated to be large (or thick), may be expressed to be small (or thin), or may be simplified for clarity of illustration, but due to this, the protective scope of the present disclosure should not be interpreted narrowly.

The terminology used herein is for the purpose of describing particular aspects (or embodiments) only and is not intended to be limiting of the present disclosure. As used herein, the singular forms are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

As shown in the drawings, according to the present disclosure, the connector for a displayed mobile device is divided into components, such as a charging cable 10, a holder casing 20, and a fixing bolt 30.

The charging cable 10 includes a wire 11, a universal serial bus (USB) port (not shown) that is electrically connected a first end of the wire 11 and is connected to a personal computer (PC) or a plug to be supplied with power, a insertion block 13 provided in a second end of the wire 11, and a connection terminal 15 that is electrically connected to the second end of the wire 11, provided by protruding from an upper surface of the insertion block 13, and connected to a connection port of the displayed mobile device.

A screw hole to which the fixing bolt 30 is tightened-coupled is formed on a lower surface of the insertion block 13. The screw hole may be formed by etching the insertion block 13, and the screw hole may be configured by inserting a metal-material insert nut 17 having the screw hole 18 therein into the insertion block 13 in an insertion method so that the insertion block 13 has the screw hole. Although the fixing bolt 30 is repeatedly tightened and released, the insert nut 17 is preferable in long term use since a thread in the screw hole 18 is not easily blunted.

The holder casing 20 holds the insertion block 13 not to be moved, so that the connection terminal 15 is locked in its regular position. The holder casing 20 supports a rear surface of the mobile device, so that the connection terminal 15 is stably connected to the connection port of the mobile device.

The holder casing 20 includes a body 21, a support plate 23, and an opening and closing plate 25.

The body 21 has a slide space 211 in which the insertion block 13 is inserted forward from the rear of the body 21 in a sliding manner, an opening 213 that is formed on an upper portion of the body 21 so that the connection terminal 15 passes therethrough and protrudes to be exposed, a long hole 215 that is formed on a lower portion of the body 21, that is, on a bottom plate thereof, so that the fixing bolt 30 being tightened-coupled to the screw hole of the insertion block 13 after passing through the long hole, and a seating depression 217 that is formed on a lower surface of the bottom plate of the body 21 around the long hole 215 so that a head 31 of the fixing bolt 30 is seated not to be exposed to the surface.

The fixing bolt 30 may be moved back and forth along the long hole 215 to adjust a position to which the insertion block 13 is tightened and locked. That is, since an interval between the connection terminal 15 provided in the insertion block 13 and the support plate 23 is adjusted, the connector may be used for various types of terminals with difference intervals between connection ports and rear surfaces of mobile devices.

The support plate 23 is perpendicular connected to the rear of the body 21 as the upper portion thereof to support the rear surface of the mobile device, which is connected to the connection terminal 15. Adhesive means such as a double-sided adhesive tape 27 is attached to the support plate 23, so that the support plate 23 may be strongly attached to the rear surface of the mobile device. A release film 28 is attached to the double-sided adhesive tape 27, so the release film 28 is removed and then the double-sided adhesive tape 27 is used before attachment of the mobile device.

Reinforcing ribs 231 are formed on a rear surface of the support plate 23 to reinforce the strength of the support plate 23.

A through hole 233 through which the connection terminal 15 passes is formed a lower portion of the support plate 23, a placing depression 235 is formed around the through hole 233, and bolt holes 237 are formed at opposite sides of the through hole 233.

The opening and closing plate 25 is removably coupled to the through hole 233 of the support plate 23.

Screw holes 257 corresponding to the bolt holes 237 of the support plate 23 are formed on opposite side surfaces of the opening and closing plate 25, so the opening and closing plate 25 is tightened and locked to the support plate 23 with tightening bolts 26. The screw holes 257 may also be formed by inserting a metal insert nut 24 into the opening and closing plate 25.

An edge of a front surface of the opening and closing plate 25 has a stopper 251, which is configured to be placed in and locked to the placing depression 235 of the support plate 23 and to have lower ends seated on and locked to an upper surface of the body 21.

As described above, the connector for the displayed mobile device according to the present disclosure has a simple configuration and a simple structure, so that the connector can be produced at low manufacturing cost and with excellent productivity. In addition, as the fixing bolt 30 of the connector is simply tightened and loosened, the interval between the connection terminal 15 and the support plate 23 may be adjusted in response to various types of mobile devices.

Although the connector for the displayed mobile device that has specific shape and structure of the preferred embodiment of the present disclosure has been disclosed with reference to the accompanying drawings, it should be understood that those skilled in the art will appreciate that various modifications, additions, and substitutions are possible and the modifications, additions, and substitutions may be included within the spirit and scope of the present disclosure as defined by the appended claims.

What is claimed is:

1. A connector for a displayed mobile device, the connector comprising:
   a charging cable comprising an insertion block, a connection terminal provided by protruding from an upper surface of the insertion block and connected to a connection port of the mobile device, and a screw hole provided on a lower surface of the insertion block; and
   a holder casing comprising a body having a slide space into which the insertion block is inserted in a sliding manner from a rear thereof and having an opening through which the connection terminal is exposed and protrudes, a support plate formed by protruding from a rear of an upper surface of the body and supporting a rear surface of the mobile device, and a long hole formed on a bottom plate of the body; and
   a fixing bolt fixing the insertion block of the charging cable to the body of the holder casing by being tightened and coupled to the screw hole after passing through the long hole,
   wherein an interval between the connection terminal and the support plate is adjustable.

2. The connector of claim 1, wherein a lower surface of the bottom plate of the holder casing has a seating depression in which a head of the fixing bolt is seated.

3. The connector of claim 1, wherein the support plate of the holder casing has a through hole through which the connection terminal passes, and an opening and closing plate is detachably coupled to the through hole.

4. The connector of claim 3, wherein a placing groove is formed around the through hole on a front surface of the support plate, and
   a stopper is formed by protruding from an edge of a front surface of the opening and closing plate, the stopper being placed in the placing groove and having a lower end placed on the upper surface of the body.

* * * * *